US008144042B2

(12) United States Patent
Mathe

(10) Patent No.: US 8,144,042 B2
(45) Date of Patent: Mar. 27, 2012

(54) COMBINATORIAL CIRCUIT WITH SHORTER DELAY WHEN INPUTS ARRIVE SEQUENTIALLY AND DELTA SIGMA MODULATOR USING THE COMBINATORIAL CIRCUIT

(75) Inventor: Lennart K. Mathe, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 23 days.

(21) Appl. No.: 12/486,266

(22) Filed: Jun. 17, 2009

(65) Prior Publication Data

US 2010/0321064 A1    Dec. 23, 2010

(51) Int. Cl.
*H03M 3/00* (2006.01)
*H03M 1/66* (2006.01)

(52) U.S. Cl. .......... 341/143; 341/144; 341/153; 326/59; 326/46

(58) Field of Classification Search .................. 341/143, 341/144, 153
See application file for complete search history.

(56) References Cited

U.S. PATENT DOCUMENTS

| | | | | | |
|---|---|---|---|---|---|
| 6,304,608 | B1 * | 10/2001 | Chen et al. | ...... | 375/252 |
| 6,639,530 | B2 * | 10/2003 | Jensen et al. | ...... | 341/143 |
| 7,183,955 | B1 | 2/2007 | Shih | | |
| 7,221,303 | B1 * | 5/2007 | Melanson | ...... | 341/143 |
| 2007/0160164 | A1 | 7/2007 | Sahota | | |

OTHER PUBLICATIONS

International Search Report and Written Opinion—PCT/US2010/039091, ISA/EPO—May 12, 2011.
Sze C N et al., "Multilevel Circuit Clustering for Delay Minimization", IEEE Transactions on Computer Aided Design of Integrated Circuits and Systems, IEEE Service Center, Piscataway, NJ, US, vol. 23, No. 7, Jul. 1, 2004, pp. 1073-1085, XP011114484, ISSN: 0278-0070, DOI:10.1109/TCAD.2004.829817.

* cited by examiner

*Primary Examiner* — Shawki S Ismail
*Assistant Examiner* — Jany Tran
(74) *Attorney, Agent, or Firm* — Eric Ho

(57) ABSTRACT

A combinatorial circuit with pre-calculation and having shorter delay is described. The combinatorial circuit uses information available from earlier input signals to pre-calculate intermediate signals, which are used to generate output signals when the last input signal arrives. The combinatorial circuit includes an input calculation block, at least one pre-calculation block, and an output calculation block coupled in series. The input calculation block receives some input signals and generates intermediate signals for the first pre-calculation block. The pre-calculation block(s) receive at least one earlier input signal and generate additional intermediate signals. The output calculation block receives the latest input signal and the intermediate signals from the last pre-calculation block and generates the output signals. The pre-calculation block(s) and the output calculation block may be implemented with simple circuits. In another aspect, a delta sigma ($\Delta\Sigma$) modulator may use the combinatorial circuit with pre-calculation in order to improve operating speed.

19 Claims, 9 Drawing Sheets

IMPLEMENTED WITH A SUCCESSIVE APPROXIMATION ANALOG-TO-DIGITAL CONVERTER (ADC)

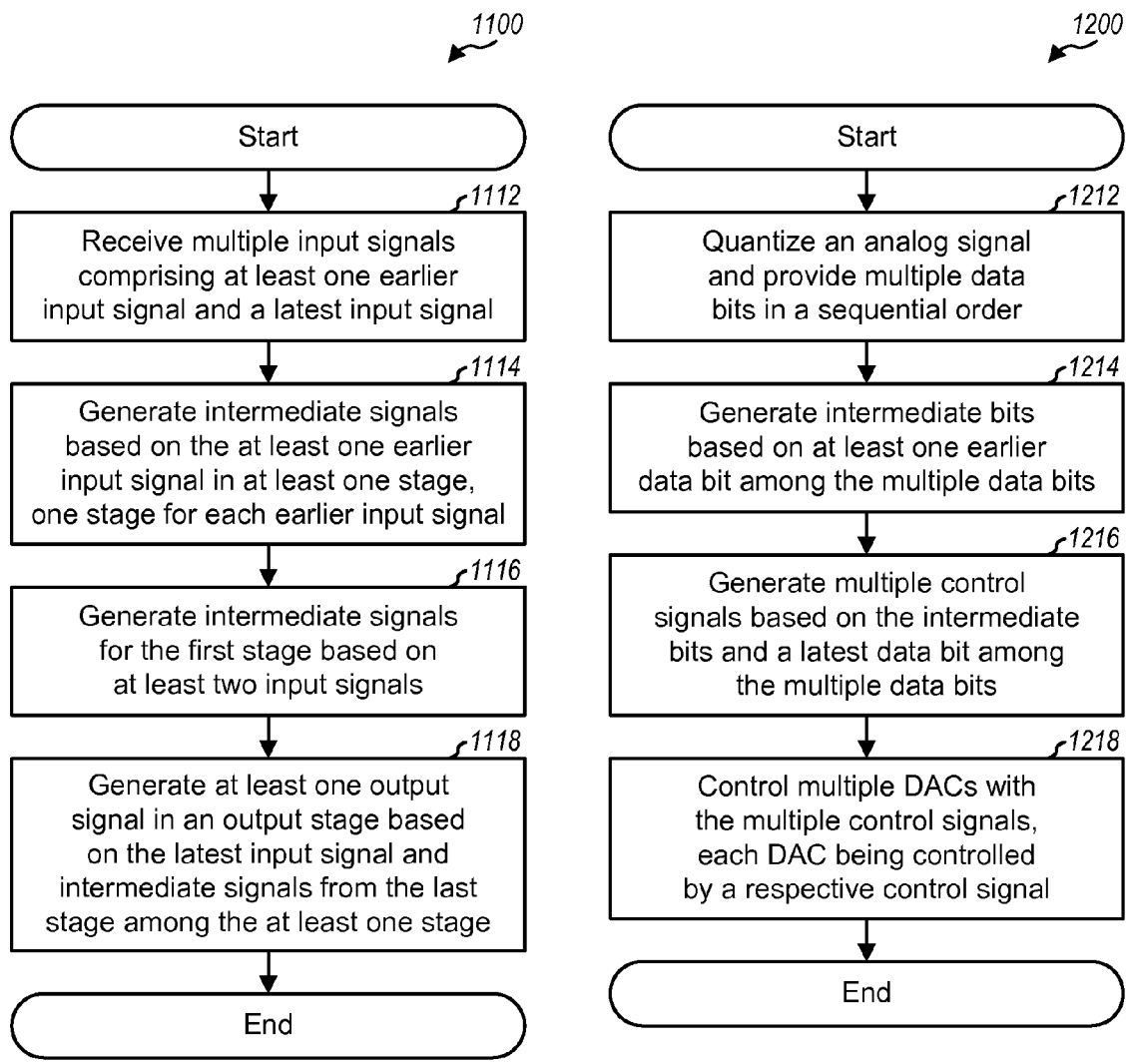

US 8,144,042 B2

COMBINATORIAL CIRCUIT WITH SHORTER DELAY WHEN INPUTS ARRIVE SEQUENTIALLY AND DELTA SIGMA MODULATOR USING THE COMBINATORIAL CIRCUIT

BACKGROUND

I. Field

The present disclosure relates generally to electronics, and more specifically to a combinatorial circuit having shorter delay.

II. Background

A combinatorial circuit/logic is a digital circuit that receives input signals and generates output signals without utilizing a clock. Whenever the input signals change, the output signals can change after a certain delay. This delay is dependent on the circuitry used to implement the combinatorial circuit, and the circuitry may in turn be dependent on the complexity of a logic function being implemented by the combinatorial circuit. In general, more input signals and/or greater complexity of the logic function may result in more levels of circuitry, which may then result in longer delay for the combinatorial circuit.

A combinatorial circuit may be used with sequential circuits, which are circuits that are triggered by a clock. For example, the combinatorial circuit may receive its input signals from one sequential circuit and may provide its output signals to another sequential circuit. In this case, the speed at which the sequential circuits can operate may be dependent on the delay of the combinatorial circuit. In general, progressively higher clock rate may be used for the sequential circuits with progressively shorter delay for the combinatorial circuit. Hence, it may be desirable to reduce the delay of the combinatorial circuit in order to support a higher clock rate for the sequential circuits.

SUMMARY

Techniques for reducing the delay of a combinatorial circuit are described herein. In an aspect, a combinatorial circuit may receive some input signals earlier than others and may be designed to use information available from the earlier input signals to pre-calculate intermediate signals. The intermediate signals may be available when the last input signal arrives. A simple output circuit with short delay may then be used to generate output signals based on the last input signal and the intermediate signals.

In an exemplary design, an apparatus implementing a combinatorial circuit with pre-calculation may comprise an input calculation block, at least one pre-calculation block, and an output calculation block. The input calculation block may receive at least two input signals and may generate intermediate signals for the first pre-calculation block. The pre-calculation block(s) may be coupled in series, may receive at least one earlier input signal and the intermediate signals from the input calculation block, and may generate additional intermediate signals. The output calculation block may receive the latest input signal and the intermediate signals from the last pre-calculation block and may generate at least one output signal.

In an exemplary design, the pre-calculation block(s) may comprise one pre-calculation block for each earlier input signal. Each pre-calculation block may comprise at least one calculation circuit. Each calculation circuit may (i) receive an earlier input signal for its pre-calculation block and two intermediate signals from either a preceding pre-calculation block or the input calculation block and (ii) generate an intermediate signal for either a subsequent pre-calculation block or the output calculation block. In an exemplary design, the output calculation block may also comprise at least one calculation circuit. Each calculation circuit may receive the latest input signal and two intermediate signals from the last pre-calculation block and may generate a respective output signal. Each calculation circuit in the pre-calculation block(s) and the output calculation block may be implemented with a simple circuit having few logic gates, as described below.

In another aspect, a combinatorial circuit with pre-calculation may be used for a delta sigma ($\Delta\Sigma$) modulator in order to improve operating speed. In an exemplary design, an apparatus implementing a $\Delta\Sigma$ modulator may comprise an M-bit quantizer (where M>1), a dynamic element matching (DEM) unit, and multiple 1-bit digital-to-analog converters (DACs) that implement an M-bit DAC. The quantizer may quantize an analog signal and provide multiple data bits in a sequential order. The DEM unit may comprise a finite state machine and an element selection circuit. The finite state machine may receive the multiple data bits from the quantizer and may generate control bits indicative of state information for the 1-bit DACs. The element selection circuit may also receive the multiple data bits from the quantizer and the control bits from the finite state machine. The element selection circuit may (i) generate intermediate bits based on at least one earlier data bit from the quantizer and the control bits and (ii) generate multiple control signals based on the intermediate bits and the latest data bit from the quantizer. The 1-bit DACs may receive the multiple control signals, and each 1-bit DAC may be controlled by a respective control signal. In an exemplary design, the element selection circuit may comprise an input calculation block, at least one pre-calculation block, and an output calculation block, which may be implemented as described above.

Various aspects and features of the disclosure are described in further detail below.

BRIEF DESCRIPTION OF THE DRAWINGS

FIG. 11 shows a process for generating output signals with reduced delay.

FIG. 12 shows a process for performing $\Delta\Sigma$ modulation with reduced delay.

DETAILED DESCRIPTION

The word "exemplary" is used herein to mean "serving as an example, instance, or illustration." Any design described herein as "exemplary" is not necessarily to be construed as preferred or advantageous over other designs.

Figure 1:
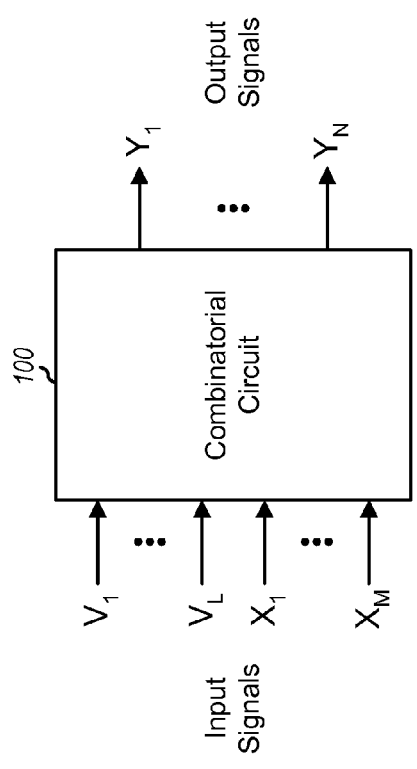
FIG. 1 shows a combinatorial circuit with two sets of input signals.

FIG. 1 shows a block diagram of an exemplary combinatorial circuit 100 that may be used for any electronics device. Combinatorial circuit 100 receives a first set of L input signals denoted as $V_1$ through $V_L$ and a second set of M input signals denoted as $X_1$ through $X_M$, where L and M may each be any integer value. Each input signal may be for one bit and may toggle between logic low ('0') and logic high ('1'). Combinatorial circuit 100 provides a set of N output signals denoted as $Y_1$ through $Y_N$, where N may be any integer value. Each output signal may also be for one bit and may toggle between logic low and high. The terms "signal" and "bit" may thus be used interchangeably herein.

The N output signals may be determined based on a logic function of the L+M input signals. This logic function may be defined by a truth table or some other means. The circuitry used to implement combinatorial circuit 100 may be dependent on the logic function and may be more complex for more input signals and/or more complex logic function. The delay from the input signals to the output signals may be dependent on the complexity and gate depth of the circuitry used to implement combinatorial circuit 100.

The circuitry used to implement combinatorial circuit 100 may be synthesized automatically using a circuit design synthesis tool known in the art or manually by a circuit designer. The circuitry may be designed without taking into account the order in which the input signals arrive and may assume that all input signals will arrive at approximately the same time. All input signals may then observe approximately equal delay through combinatorial circuit 100.

In some applications, some or all input signals for a combinatorial circuit may arrive in a sequential order instead of in parallel. For example, the L input signals $V_1$ through $V_L$ may arrive in parallel, and the M input signals $X_1$ through $X_M$ may arrive in a sequential order, with $X_M$ being the earliest input signal and $X_1$ being the latest input signal. The delay of combinatorial circuit 100 may then be dependent on the delay from the latest input signal $X_1$ to the output signals.

In an aspect, a combinatorial circuit may be designed to use information available from earlier input signals to pre-calculate intermediate signals. The intermediate signals may be available when the last input signal arrives. A simple output circuit with short delay may then be used to generate the output signals based on the last input signal and the intermediate signals. The delay of the combinatorial circuit may then be reduced, possibly to as short as the delay of the output circuit.

Figure 2:
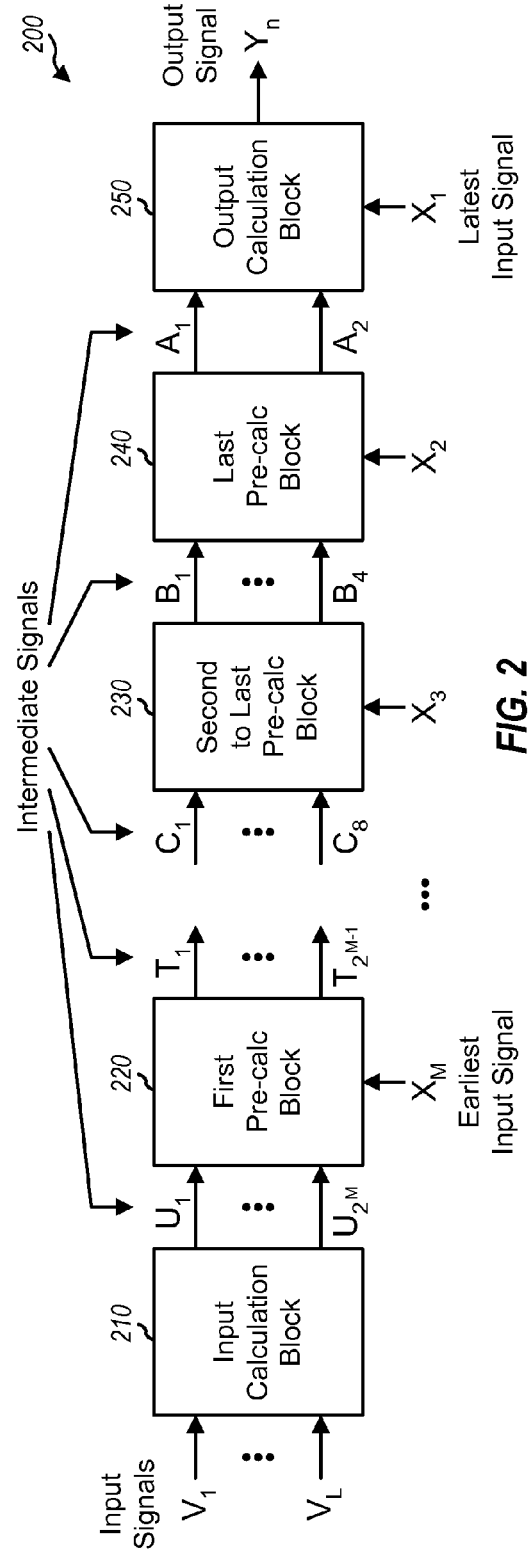
FIG. 2 shows an exemplary design of a combinatorial circuit with pre-calculation.

FIG. 2 shows a block diagram of an exemplary design of a combinatorial circuit with pre-calculation 200, which may be used to implement combinatorial circuit 100 in FIG. 1. For simplicity, FIG. 2 shows combinatorial circuit 200 generating one output signal $Y_n$, which may be one of the N output signals from combinatorial circuit 100. The remaining output signals from combinatorial circuit 100 may be generated using similar circuits.

In the exemplary design shown in FIG. 2, combinatorial circuit 200 includes M+1 blocks 210 through 250 coupled in series. An input calculation block 210 receives the set of L input signals $V_1$ through $V_L$ and generates $2^M$ intermediate signals for a first pre-calculation (pre-calc) block 220. Pre-calculation block 220 also receives the earliest input signal $X_M$ and generates $2^{M-1}$ intermediate signals for a subsequent pre-calculation block (not shown in FIG. 2). In general, each pre-calculation block m, where m $\in \{2, \ldots, M\}$, receives $2^m$ intermediate signals from a preceding block as well as input signal $X_m$ and generates $2^{m-1}$ intermediate signals for a subsequent block. An output calculation block 250 receives two intermediate signals $A_1$ and $A_2$ from the last pre-calculation block 240 and generates the output signal $Y_n$.

Pre-calculation blocks 220 through 240 and output calculation block 250 may be implemented with a simply circuit that may have a short delay, as described below. The delay of each input signal $X_m$ to output signal $Y_n$ may be dependent on the number of blocks that input signal $X_m$ propagates through in order to reach the output signal. Input signal $X_1$ goes through only one block 250 and has the shortest delay. Input signal $X_2$ goes through two blocks 240 and 250 and has the next shortest delay. Input signal $X_M$ goes through M blocks 220 through 250 and has the longest delay. However, since $X_M$ is the earliest input signal, $X_M$ may be able to propagate through some or most of the M blocks prior to the arrival of the latest input signal $X_1$. If input signals $X_2$ through $X_M$ can propagate through their respective blocks and arrive at output calculation block 250 prior to the arrival of input signal $X_1$, then the delay of combinatorial circuit 200 may be equal to the delay of output calculation block 250, which may be short. This may allow sequential circuits coupled to combinatorial circuit 200 to operate at a higher clock rate, which may be desirable.

Figure 3:
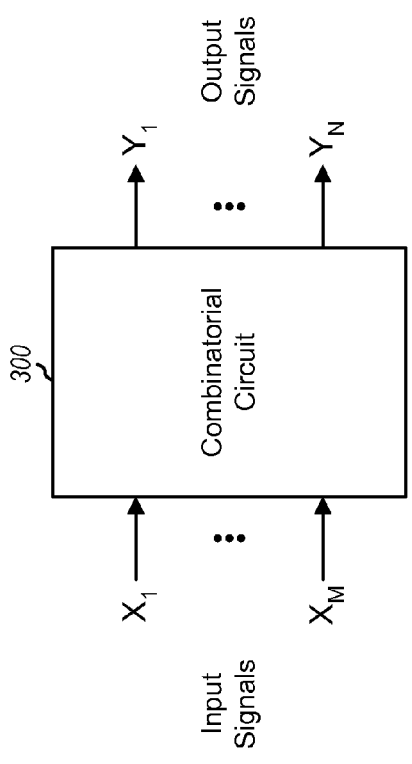
FIG. 3 shows a combinatorial circuit with one set of input signals.

FIG. 3 shows a block diagram of an exemplary combinatorial circuit 300 that may be used for any electronics device. Combinatorial circuit 300 receives a set of M input signals denoted as $X_1$ through $X_M$, where M may be any integer value. Combinatorial circuit 300 provides a set of N output signals denoted as $Y_1$ through $Y_N$, where N may be any integer value. The N output signals may be determined based on a logic function of the M input signals. This logic function may be defined by a truth table or some other means. The M input signals $X_1$ through $X_M$ may arrive in a sequential order, with $X_M$ being the earliest input signal and $X_1$ being the latest input signal. The delay of combinatorial circuit 300 may then be dependent on the delay from the latest input signal $X_1$ to the output signals.

Figure 4:
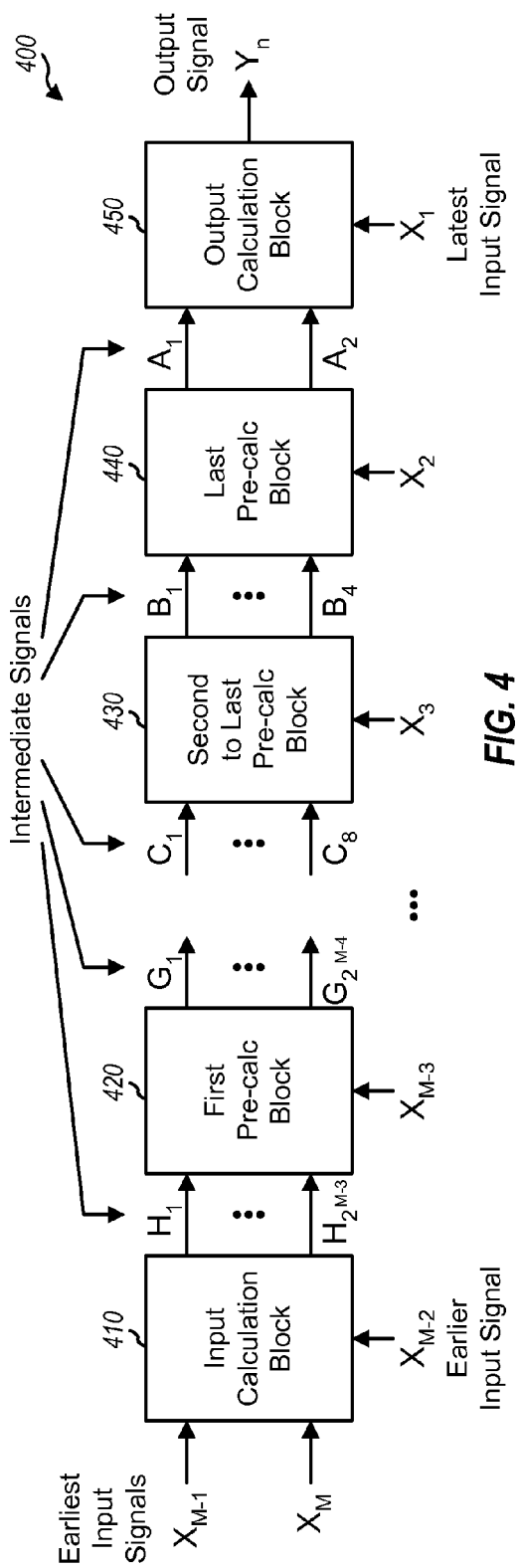
FIG. 4 shows another exemplary design of a combinatorial circuit with pre-calculation.

FIG. 4 shows a block diagram of an exemplary design of a combinatorial circuit with pre-calculation 400, which may be used to implement combinatorial circuit 300 in FIG. 3. For simplicity, FIG. 4 shows combinatorial circuit 400 generating one output signal $Y_n$, which may be one of the N output signals from combinatorial circuit 300. The remaining output signals from combinatorial circuit 300 may be generated using similar circuits.

In the exemplary design shown in FIG. 4, circuit 400 includes M−2 blocks 410 through 450 coupled in series. An input calculation block 410 receives the three earliest input signals $X_{M-2}$, $X_{M-1}$ and $X_M$ and generates $2^{M-3}$ intermediate signals for the first pre-calculation block 420. In general, each pre-calculation block m, where m $\in \{2, \ldots, M-3\}$, receives $2^m$ intermediate signals from a preceding block as well as input signal $X_m$ and generates $2^{m-1}$ intermediate signals for a subsequent block. An output calculation block 450 receives the two intermediate signals $A_1$ and $A_2$ from the last pre-calculation block 440 and generates the output signal $Y_n$.

Pre-calculation blocks 420 through 440 and output calculation block 450 may be implemented with a simply circuit that may have a short delay, as described below. Input signals that arrive successively later may propagate through progressively fewer blocks and may then observe progressively shorter delay. The delay of combinatorial circuit 400 may be dependent on the delay from the latest input signal $X_1$ to the output signal, which may be as short as the delay of output calculation block 450.

The exemplary designs shown in FIGS. 2 and 4 can implement any logic truth table. The number of pre-calculation blocks may be dependent on the number input signals (M). Input signals $X_2$ through $X_M$ may arrive early and may be used to pre-calculate intermediate signals $A_1$ and $A_2$. When the last input signal $X_1$ arrives, output calculation block 250 or 450 can quickly calculate the output signal $Y_n$. The delay from $X_1$ to $Y_n$ is equal to the delay of output calculation block 250 or 450 regardless of the size of the truth table.

Pre-calculation blocks 220 through 240 and output calculation block 250 in FIG. 2 as well as pre-calculation blocks 420 through 440 and output calculation block 450 in FIG. 4 may be implemented with various circuits. It may be desirable to implement these blocks with circuits having as short a delay as possible. It may also be desirable to implement these blocks with a common circuit, which may reduce design complexity.

Figure 5A:
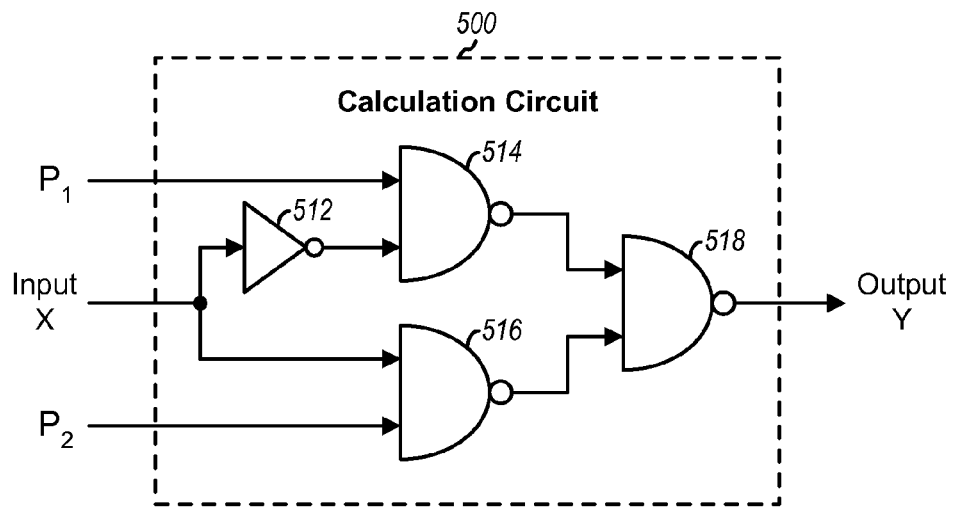
FIGS. 5A and 5B show two exemplary designs of a calculation circuit.

FIG. 5A shows a schematic diagram of an exemplary design of a calculation circuit 500, which may be used as a building block for combinatorial circuits 200 and 400 in FIGS. 2 and 4. In this exemplary design, calculation circuit 500 receives a data input X and two control inputs $P_1$ and $P_2$ and provides an output Y. Data input X may correspond to one of the input signals $X_1$ through $X_M$. Control inputs $P_1$ and $P_2$ may correspond to two intermediate signals from a preceding pre-calculation block or an input calculation block. Output Y may correspond to one of the output signals $Y_1$ through $Y_N$ or an intermediate signal for a subsequent pre-calculation block.

In the exemplary design shown in FIG. 5A, data input X is provided to an input of an inverter 512 and to one input of a NAND gate 516. The output of inverter 512 is coupled to one input of a NAND gate 514. Control inputs $P_1$ and $P_2$ are provided to the other inputs of NAND gates 514 and 516, respectively. A NAND gate 518 has its two inputs coupled to the outputs of NAND gates 514 and 516 and its output providing output Y. Table 1 shows a truth table for calculation circuit 500.

TABLE 1

Truth Table for Calculation Circuit

| $P_1$ | $P_2$ | X | Y | Comment |
|---|---|---|---|---|
| 0 | 0 | 0 | 0 | Y = 0 |
| 0 | 0 | 1 | 0 | |
| 0 | 1 | 0 | 0 | Y = X |
| 0 | 1 | 1 | 1 | |
| 1 | 0 | 0 | 1 | Y = inverse (X) |
| 1 | 0 | 1 | 0 | |
| 1 | 1 | 0 | 1 | Y = 1 |
| 1 | 1 | 1 | 1 | |

The truth table in Table 1 may be summarized as follows:
If output Y is 0 regardless of input X, then $P_1=P_2=0$,
If output Y is 1 regardless of input X, then $P_1=P_2=1$,
If output Y is equal to input X, then $P_1=0$ and $P_2=1$, and
If output Y is equal to the inverse of input X, then $P_1=1$ and $P_2=0$.

Figure 5B:
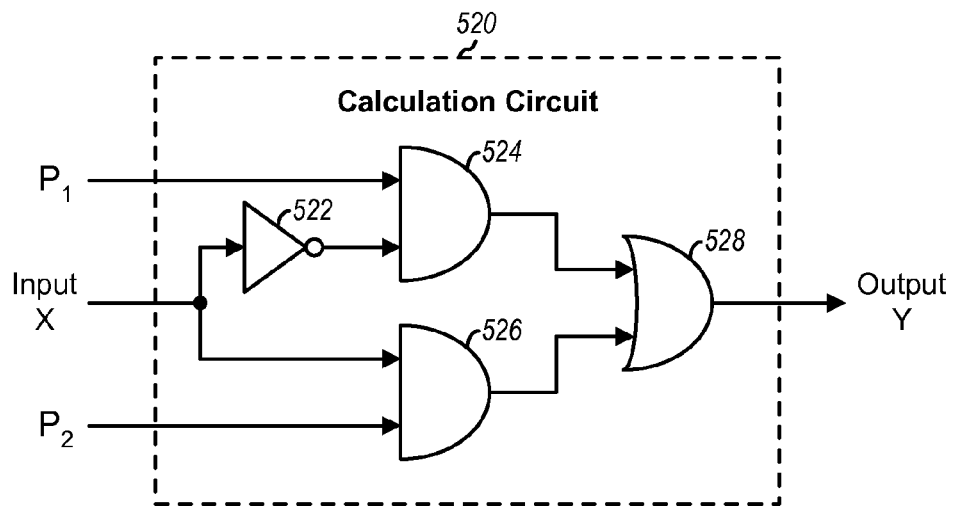

FIG. 5B shows a schematic diagram of an exemplary design of another calculation circuit 520 that may also be used as a building block for combinatorial circuits 200 and 400 in FIGS. 2 and 4. Calculation circuit 520 receives a data input X and two control inputs $P_1$ and $P_2$ and provides an output Y. Data input X is provided to an input of an inverter 522 and to one input of an AND gate 526. The output of inverter 522 is coupled to one input of an AND gate 524. Control inputs $P_1$ and $P_2$ are provided to the other inputs of AND gates 524 and 526, respectively. An OR gate 528 has its two inputs coupled to the outputs of AND gates 524 and 526 and its output providing output Y. Calculation circuit 520 implements the truth table shown in Table 1.

FIGS. 5A and 5B show two exemplary designs of calculation circuits that can implement the truth table shown in Table 1. This truth table may also be implemented with other circuits. Different permutation of P1/P2 coding in the truth table may also be implemented with similar end result. The exemplary designs shown in FIGS. 5A and 5B have a delay of three logic gates from input X to output Y. Combinatorial circuits 200 and 400 may be implemented using calculation circuit 500 in FIG. 5A or calculation circuit 520 in FIG. 5. This may greatly reduce the delay of combinatorial circuits 200 and 400. Combinatorial circuits 200 and 400 may also be implemented with other calculation circuits, which may implement truth tables different from the one shown in Table 1. In general, the two control inputs P1 and P2 may have one of four possible sets of values (or combinations) 00, 01, 10 and 11. The output Y may have one of four possible values Y=0, Y=1, Y=X and Y=inverse (X). The four possible values of Y may be mapped to the four possible sets of values for P1 and P2 based on any mapping. The value of Y may then be determined by the set of values for P1 and P2 and the selected mapping.

For clarity, an exemplary design of a combinatorial circuit using calculation circuit 500 in FIG. 5A is described below. This exemplary combinatorial circuit has the structure shown in FIG. 4, receives four input signals $X_1$ through $X_4$ (and no V input signals), and provides a single output signal Y. $X_1$ is the latest input signal, and $X_4$ is the earliest input signal. It is thus desirable to minimize the delay from $X_1$ to Y. The first five columns of Table 2 show a truth table for a desired logic function for the exemplary combinatorial circuit.

TABLE 2

Exemplary Logic Function

| Logic Function | | | | | Intermediate Signals for Output Calculation Block | | |
|---|---|---|---|---|---|---|---|
| $X_4$ | $X_3$ | $X_2$ | $X_1$ | Y | $A_1$ | $A_2$ | Comment/Observation |
| 0 | 0 | 0 | 0 | 0 | 0 | 0 | Y = 0 regardless of $X_1$ |
| 0 | 0 | 0 | 1 | 0 | | | |
| 0 | 0 | 1 | 0 | 0 | 0 | 1 | Y = $X_1$ |
| 0 | 0 | 1 | 1 | 1 | | | |
| 0 | 1 | 0 | 0 | 1 | 1 | 0 | Y = inverse ($X_1$) |
| 0 | 1 | 0 | 1 | 0 | | | |
| 0 | 1 | 1 | 0 | 1 | 1 | 1 | Y = 1 regardless of $X_1$ |
| 0 | 1 | 1 | 1 | 1 | | | |
| 1 | 0 | 0 | 0 | 1 | 1 | 0 | Y = inverse ($X_1$) |
| 1 | 0 | 0 | 1 | 0 | | | |
| 1 | 0 | 1 | 0 | 0 | 0 | 0 | Y = 0 regardless of $X_1$ |
| 1 | 0 | 1 | 1 | 0 | | | |
| 1 | 1 | 0 | 0 | 1 | 1 | 1 | Y = 1 regardless of $X_1$ |
| 1 | 1 | 0 | 1 | 1 | | | |
| 1 | 1 | 1 | 0 | 0 | 0 | 1 | Y = $X_1$ |
| 1 | 1 | 1 | 1 | 1 | | | |

The first step in synthesizing the exemplary combinatorial circuit is to determine intermediate signals $A_1$ and $A_2$ for output calculation block 450. This may be achieved by processing each pair of consecutive rows in Table 2, examining $X_1$ and Y in the two rows, and determining the values of $A_1$ and $A_2$ for the two rows based on the values of $X_1$ and Y and using the truth table for the calculation circuit in Table 1. The results of this processing are shown in the last three columns of Table 2. For a large complex logic table, this operation may be performed in software.

Figure 6A:
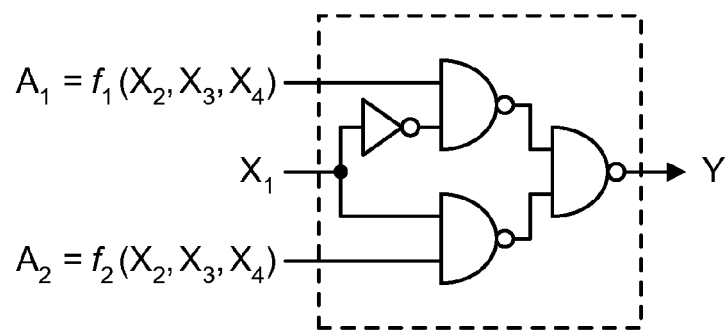
FIGS. 6A to 6C show synthesis of a combinatorial circuit with pre-calculation.

FIG. 6A shows a schematic diagram of the output calculation block for the exemplary combinatorial circuit. Output signal Y may be generated based on input signal $X_1$ and intermediate signals $A_1$ and $A_2$. Each intermediate signal may be generated based on the three remaining input signals $X_2$, $X_3$ and $X_4$ and is not dependent on input signal $X_1$, so that $A_i = f_i(X_2, X_3, X_4)$, where $f_i(\ )$ denotes a logic function for the i-th intermediate signal $A_i$. $X_2$, $X_3$ and $X_4$ may arrive earlier than $X_1$ and may be used to pre-calculate $A_1$ and $A_2$ in advance, so that Y can be calculated after three gate delays when $X_1$ arrives.

The second step in synthesizing the exemplary combinatorial circuit is to determine intermediate signals $B_1$ to $B_4$ for the last pre-calculation block 440, which generates intermediate signals $A_1$ and $A_2$. This may be achieved by considering $A_1$ as an output and re-applying the first step described above to determine $B_1$ and $B_2$. Similarly, $A_2$ may be considered as another output, and the first step may be re-applied to determine $B_3$ and $B_4$. Since $A_1$ and $A_2$ do not depend on $X_1$, the truth table in the first five columns of Table 2 may be reduced from 16 entries to 8.

Table 3 shows the results of the processing to determine $B_1$ to $B_4$. To determine $B_1$ and $B_2$, each pair of consecutive rows in the first four columns in the left half of Table 3 may be evaluated, $X_2$ and $A_1$ may be examined, and the values of $B_1$ and $B_2$ may be determined based on the values of $X_2$ and $A_1$ and using the truth table in Table 1. Similarly, to determine $B_3$ and $B_4$, each pair of consecutive rows in the first four columns in the right half of Table 3 may be evaluated, $X_2$ and $A_2$ may be examined, and the values of $B_3$ and $B_4$ may be determined based on the values of $X_2$ and $A_2$ and using the truth table in Table 1.

TABLE 3

| Intermediate Signals $B_1$ and $B_2$ for Pre-calculation Block to generate $A_1$ | | | | | | Intermediate Signals $B_3$ and $B_4$ for Pre-calculation Block to generate $A_2$ | | | | | |
|---|---|---|---|---|---|---|---|---|---|---|---|
| $X_4$ | $X_3$ | $X_2$ | $A_1$ | $B_1$ | $B_2$ | $X_4$ | $X_3$ | $X_2$ | $A_2$ | $B_3$ | $B_4$ |
| 0 | 0 | 0 | 0 | 0 | 0 | 0 | 0 | 0 | 0 | 0 | 1 |
| 0 | 0 | 1 | 0 |   |   | 0 | 0 | 1 | 1 |   |   |
| 0 | 1 | 0 | 1 | 1 | 1 | 0 | 1 | 0 | 0 | 0 | 1 |
| 0 | 1 | 1 | 1 |   |   | 0 | 1 | 1 | 1 |   |   |
| 1 | 0 | 0 | 1 | 1 | 0 | 1 | 0 | 0 | 0 | 0 | 0 |
| 1 | 0 | 1 | 0 |   |   | 1 | 0 | 1 | 0 |   |   |
| 1 | 1 | 0 | 1 | 1 | 0 | 1 | 1 | 0 | 1 | 1 | 1 |
| 1 | 1 | 1 | 0 |   |   | 1 | 1 | 1 | 1 |   |   |

Figure 6B:
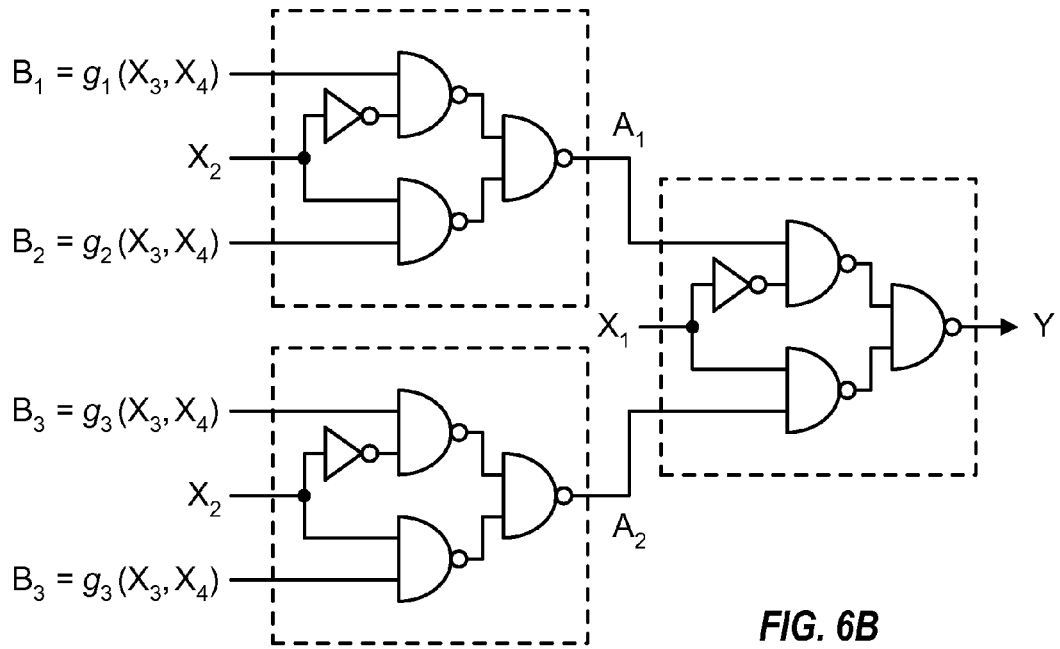

FIG. 6B shows a schematic diagram of the pre-calculation block and the output calculation block for the exemplary combinatorial circuit. $A_1$ may be generated based on $X_2$ and intermediate signals $B_1$ and $B_2$. $A_2$ may be generated based on $X_2$ and intermediate signals $B_3$ and $B_4$. $B_1$ to $B_4$ may each be generated based on the remaining two input signals $X_3$ and $X_4$ and are not dependent on input signals $X_1$ and $X_2$, so that $B_j = g_j(X_3, X_4)$, where $g_j(\ )$ denotes a logic function for the j-th intermediate signal $B_j$. $X_3$ and $X_4$ may arrive earlier than $X_1$ and $X_2$ and may be used to pre-calculate $B_1$ to $B_4$ in advance.

Table 4 shows input signals $X_3$ and $X_4$ and intermediate signals $B_1$ to $B_4$.

TABLE 4

| $X_4$ | $X_3$ | $B_1$ | $B_2$ | $B_3$ | $B_4$ |
|---|---|---|---|---|---|
| 0 | 0 | 0 | 0 | 0 | 1 |
| 0 | 1 | 1 | 1 | 0 | 1 |
| 1 | 0 | 1 | 0 | 0 | 0 |
| 1 | 1 | 1 | 0 | 1 | 1 |

As shown in Table 4, $B_1$ to $B_4$ may be generated as follows:

$$B_1 = X_3 \text{ OR } X_4 \quad B_2 = /X_3 \text{ NOR } X_4 \quad B_3 = X_3 \text{ AND } X_4 \quad B_4 = /X_3 \text{ NAND } X_4$$

where "/" denotes an inverse. $B_1$ to $B_4$ may also be generated with other logic gates.

Figure 6C:
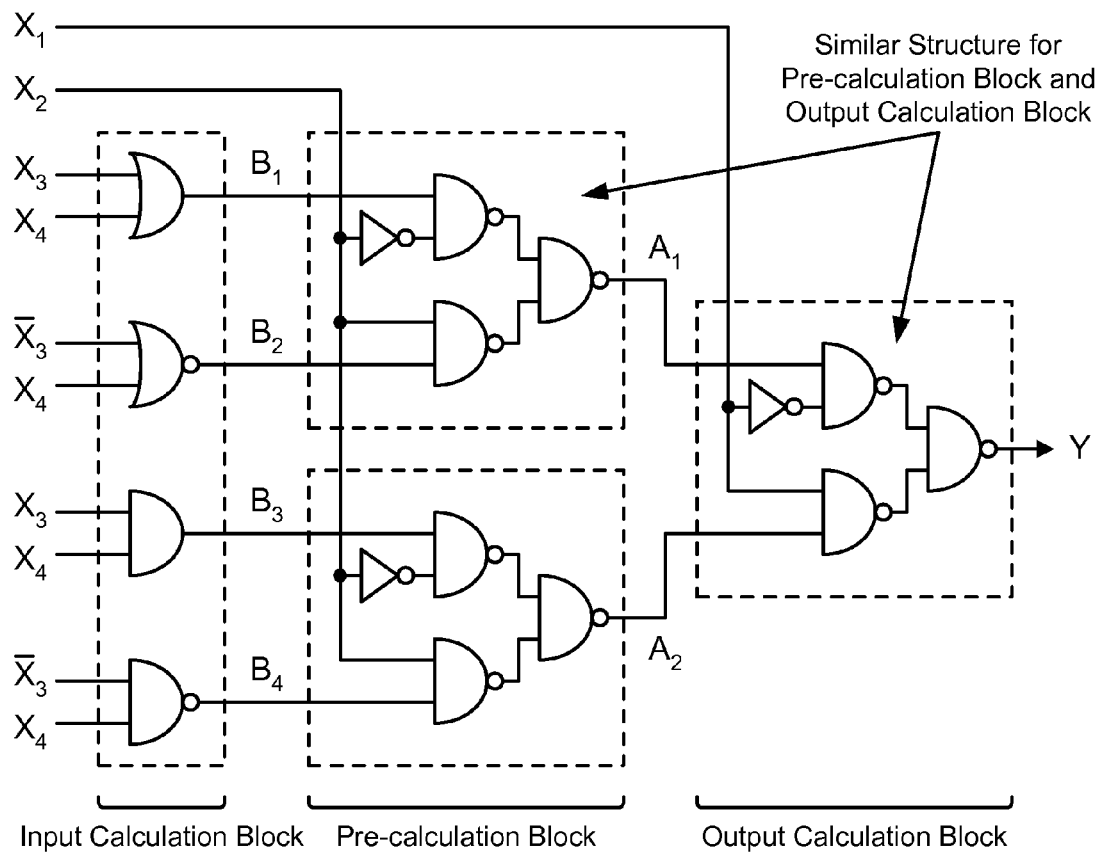

FIG. 6C shows a schematic diagram of the input calculation block, the pre-calculation block, and the output calculation block for the exemplary combinatorial circuit. $B_1$ to $B_4$ may be generated based on $X_3$ and $X_4$, as described above.

In general, a combinatorial circuit for any truth table may be recursively synthesized as described above, one input signal at a time, starting with the latest input signal $X_1$. The processing for the latest input signal $X_1$ may receive the output signal Y and determine intermediate signals $A_1$ and $A_2$ to be generated by input signal $X_2$. The processing for each input signal $X_m$ may receive the intermediate signals from the processing for the next later input signal $X_{m-1}$ and may determine the intermediate signals for the next earlier input signal $X_{m+1}$. When only two input signals $X_{M-1}$ and $X_M$ are left, each intermediate signal may be generated directly from these two input signals using a logic gate, as illustrated by the example above.

As shown in FIG. 6C, the pre-calculation block(s) and the output calculation block may be implemented with calculation circuits and may have a similar structure. This structure may be independent of the truth table being implemented. This may simplify the design of the pre-calculation block(s) and the output calculation block. The input calculation block may be dependent on the truth table being implemented.

The combinatorial circuit with pre-calculation described herein may substantially reduce the delay from the latest input signal $X_1$ to the output signals Y. The improvement in delay may be illustrated by another exemplary combinatorial circuit that receives seven input signals and generates eight output signals. This exemplary combinatorial circuit was synthesized with three different methods:

1. Digital logic design software that is commercially available and automatically synthesizes the combinatorial circuit,
2. Manual synthesize of the truth table by a circuit designer (i.e., a person), and
3. Synthesize of the truth table using the pre-calculation blocks described herein.

Table 5 summarizes the results of a transistor level circuit simulation of the three methods of synthesizing the exemplary combinatorial circuit. As shown in Table 5, delay may be substantially reduced from 500 picoseconds (ps) to 50 ps using the pre-calculation blocks. The number of transistors used to implement the combinatorial circuit may increase, but the additional transistors may be worth the tradeoff for speed critical applications.

TABLE 5

| Logic Synthesis Method | Delay | # of Transistors |
|---|---|---|
| Using circuit design tool | 500 ps | 374 |
| Manual synthesize | 300 ps | 320 |
| Using pre-calculation blocks | 50 ps | 786 |

The combinatorial circuit with pre-calculation described herein may be used for various circuit blocks and various applications. The combinatorial circuit may improve operating speed and possibly provide other advantages. An exemplary use of the combinatorial circuit in a $\Delta\Sigma$ modulator is described below.

Figure 7:
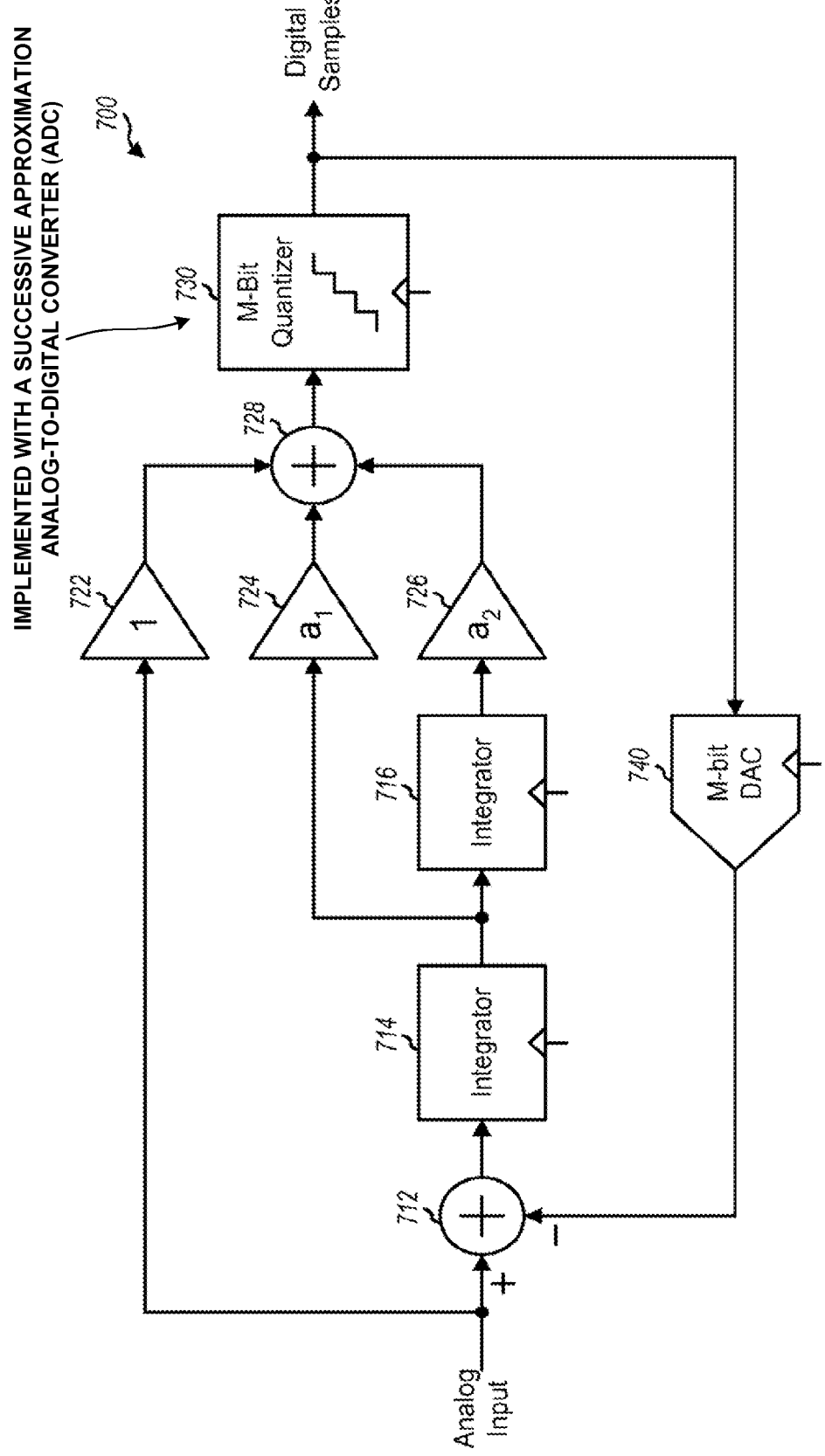
FIG. 7 shows an exemplary design of a $\Delta\Sigma$ modulator.

FIG. 7 shows a block diagram of an exemplary design of a second-order ΔΣ modulator 700. ΔΣ modulator 700 receives and digitizes an analog input signal and provides digital samples. Each digital sample comprises M bits, where M may be any value greater than one. ΔΣ modulator 700 also performs noise shaping of the quantization noise, which may improve dynamic range.

Within ΔΣ modulator 700, the analog input signal is provided to both a summer 712 and a gain element 722. Summer 712 also receives an analog feedback signal from an M-bit DAC 740, subtracts the analog feedback signal from the analog input signal, and provides an error signal to a first integrator 714. Integrator 714 integrates the error signal and provides a first integrated signal to both a second integrator 716 and a gain element 724. Integrator 716 integrates the first integrated signal and provides a second integrated signal to a gain element 726. Gain elements 722, 724 and 726 scale their input signals with gains of 1, $a_1$ and $a_2$, respectively. The gains $a_1$ and $a_2$ may be selected to obtain a desired noise transfer function for ΔΣ modulator 700. A summer 728 sums the outputs of gain elements 722, 724 and 726 and provides an internal analog signal. An M-bit quantizer 730 quantizes the internal analog signal to M bits and provides the digital samples. DAC 740 receives the digital samples and generates the analog feedback signal for summer 712.

Various circuit blocks within ΔΣ modulator 700 may operate based on a sample clock. For example, integrators 714 and 716, quantizer 730, and DAC 740 may be triggered by the sample clock.

FIG. 7 shows an exemplary design of a second-order ΔΣ modulator, which may also be implemented with other designs. A higher-order ΔΣ modulator may also be used and may be implemented with various designs known in the art.

It may be desirable to obtain a good dynamic range for ΔΣ modulator 700. Good dynamic range may be obtained for a given bandwidth by using the highest possible sample rate and having as many bits in quantizer 730 as possible. DAC 740 should also be very linear in order to obtain good performance for ΔΣ modulator 700.

Quantizer 730 may be implemented with a successive approximation analog-to-digital converter (ADC), which may be preferred over a flash quantizer in deep submicron integrated circuit (IC) process due to its excellent linearity and no need to calibrate individual comparators as in the flash quantizer. The successive approximation ADC digitizes an analog signal to M bits by successively determining one bit at a time, starting with the most significant bit (MSB) and concluding with the least significant bit (LSB). The M bits of each digital sample may be denoted as $X_1$ through $X_M$, where $X_1$ is the LSB and $X_M$ is the MSB. Quantizer 730 may provide $X_M$ first, followed by $X_{M-1}$, . . . , followed by $X_2$, and then followed by $X_1$.

Figure 8:
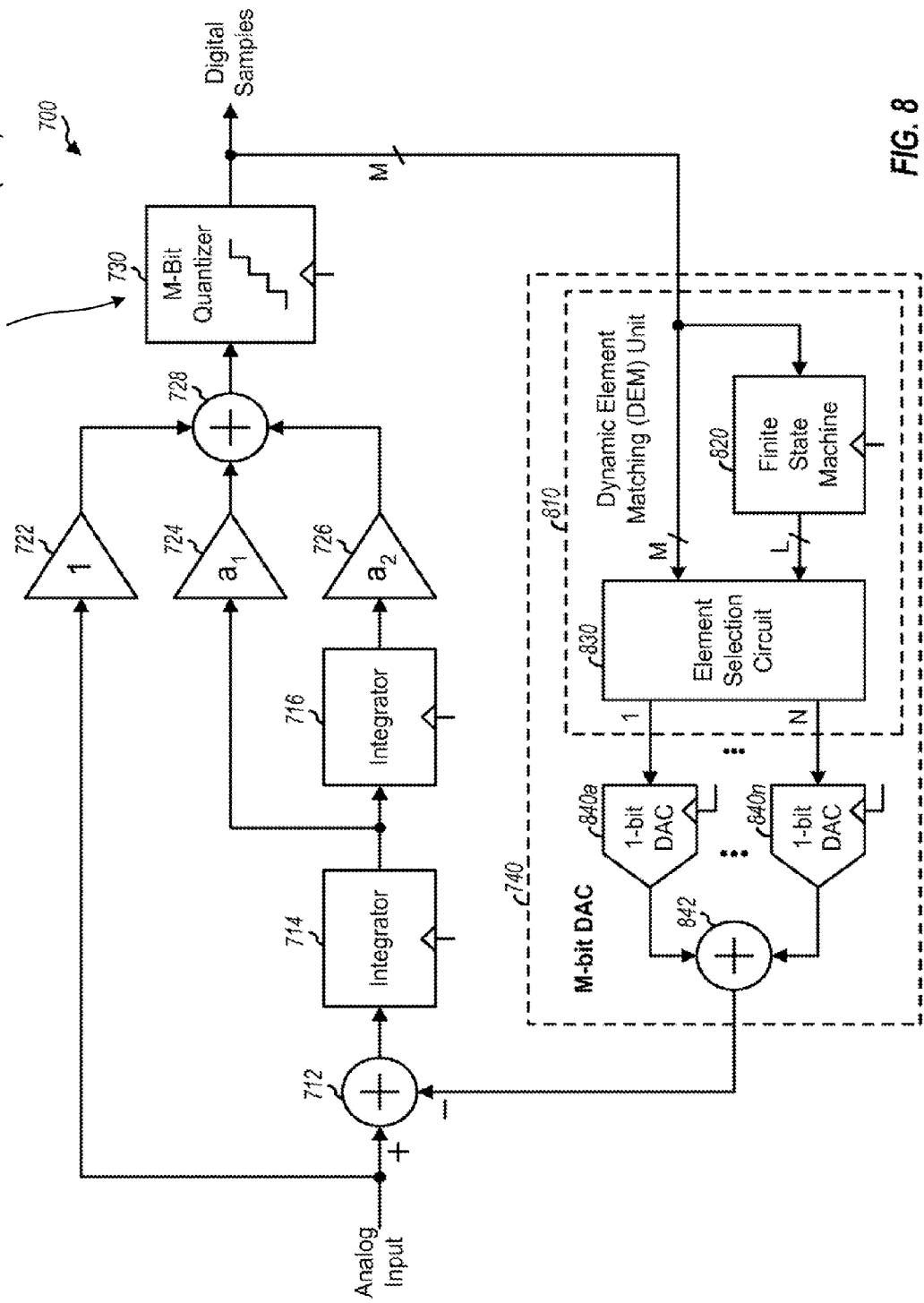
FIG. 8 shows an exemplary design of an M-bit DAC within the $\Delta\Sigma$ modulator.

FIG. 8 shows a block diagram of an exemplary design of M-bit DAC 740 in FIG. 8. DAC 740 receives M-bit digital samples from quantizer 730 and generates the analog feedback signal for summer 712. In the exemplary design shown in FIG. 8, DAC 740 is implemented with a dynamic element matching (DEM) unit 810, N 1-bit DACs 840a to 840n coupled in parallel, where $N=2^M-1$, and a summer 842. For example, M may be equal to four, and a 4-bit DAC may be implemented with 15 1-bit DACs connected in parallel. The N 1-bit DACs 840 should match one another. However, mismatches usually exist between the 1-bit DACs due to IC process variations and other factors. The mismatches between the 1-bit DACs may be handled by DEM unit 810, which may implement any DEM algorithm known in the art. For example, DEM unit 810 may select different 1-bit DACs in a pseudo-random manner or may rotate/cycle through the N 1-bit DACs so that deleterious effects due to mismatches in the 1-bit DACs can be mitigated.

In the exemplary design shown in FIG. 8, DEM unit 810 includes a finite state machine (FSM) 820 and an element selection circuit 830. FSM 820 keeps track of which 1-bit DACs 840 are currently selected and provides an L-bit control, which may be indicative of state information for the 1-bit DACs. Element selection circuit 830 receives the M-bit digital samples from quantizer 730 and the L-bit control from FSM 820. Element selection circuit 830 enables all or a subset of the N 1-bit DACs 840 based on the received bits. The number of 1-bit DACs to enable may be determined by the M-bit digital samples. Which particular 1-bit DACs to enable may be determined by the L-bit control.

Quantizer 730, FSM 820, and 1-bit DACs 840 may operate based on the sample clock. The signal path from quantizer 730 through element selection circuit 830 to 1-bit DACs 840 may be the speed critical path in ΔΣ modulator 700. Element selection circuit 830 receives L+M input bits and generates N control signals for the N 1-bit DACs 840. L+M may be relatively large, e.g., may be equal to 8 or more. A large number of input bits may result in a relatively large and deep logic tree that may take a long time for the input bits to propagate through. A large delay for element selection circuit 830 may reduce the maximum sample rate at which ΔΣ modulator 700 can operate.

Element selection circuit 830 may be implemented with a combinatorial circuit with pre-calculation in order to reduce delay. The combinatorial circuit may take advantage of the information available early from quantizer 730, so that the combinatorial circuit can essentially operate in parallel with quantizer 730.

Figure 9:
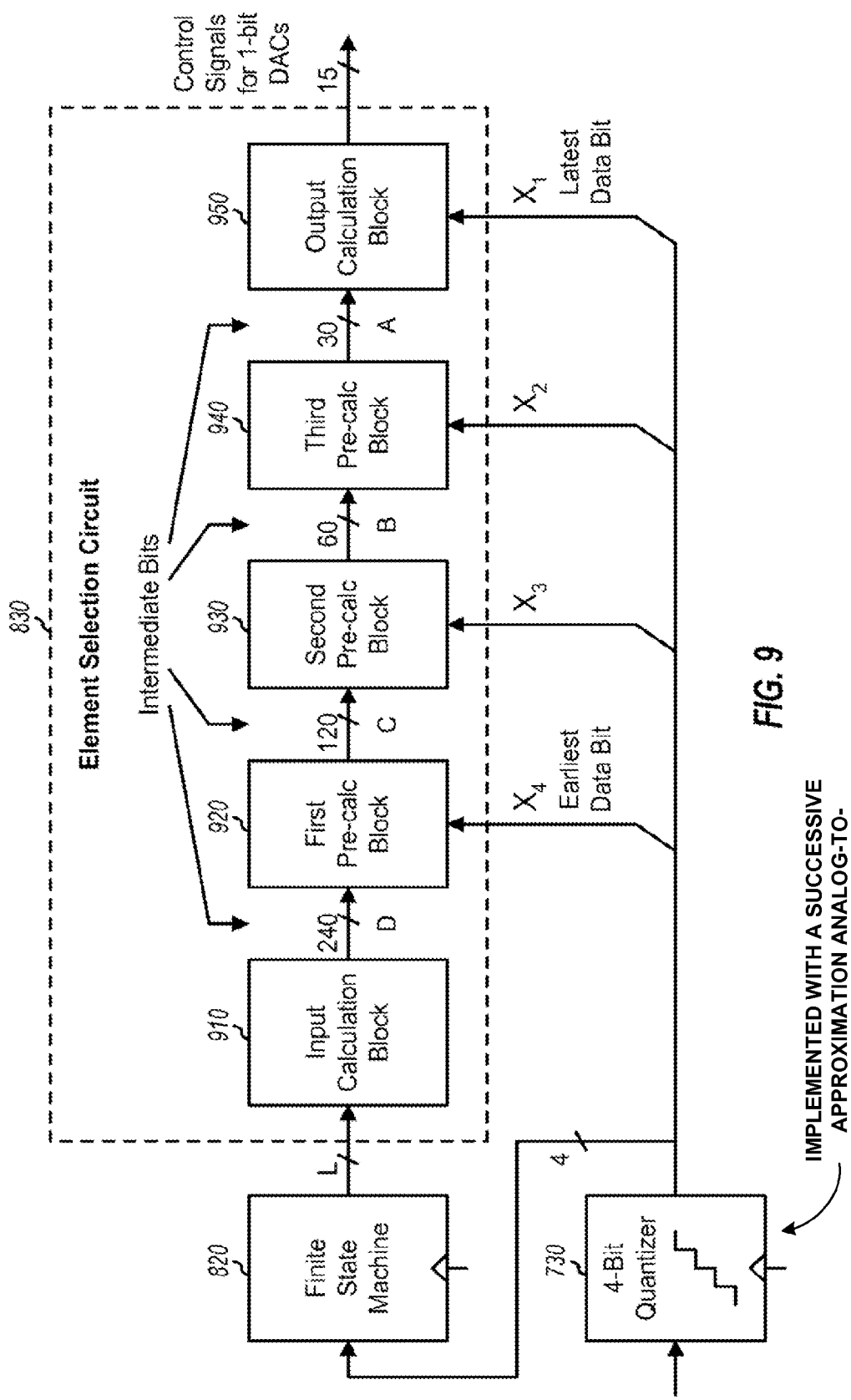
FIG. 9 shows an exemplary design of an element selection circuit.

FIG. 9 shows a block diagram of an exemplary design of element selection circuit 830 implemented with a combinatorial circuit with pre-calculation, using the structure shown in FIG. 2. In this exemplary design, M=4 and N=15. Quantizer 730 provides 4-bit digital samples. Each data sample comprises $X_1, X_2, X_3$ and $X_4$ data bits, with $X_4$ being provided first and $X_1$ being provided last. Element selection circuit 830 provides 15 control signals for 15 1-bit DACs 840.

Within element selection circuit 830, an input calculation block 910 receives the L control bits from FSM 820 and generates 240 intermediate bits based on a truth function for FSM 820. A first pre-calculation block 920 receives the 240 intermediate bits from FSM 820 and the earliest data bit $X_4$ from quantizer 730 and generates 120 intermediate bits. A second pre-calculation block 930 receives the 120 intermediate bits from the first pre-calculation block 920 and the second earliest data bit $X_3$ from quantizer 730 and generates 60 intermediate bits. A third/last pre-calculation block 940 receives the 60 intermediate bits from the second pre-calculation block 930 and the third earliest data bit $X_2$ from quantizer 730 and generates 30 intermediate bits. An output calculation block 950 receives the 30 intermediate bits from the last pre-calculation block 940 and the latest data bit $X_1$ from quantizer 730 and generates the 15 control signals.

As shown in FIG. 9, when the $X_4$ data bit arrives, partial information is available and is used to pre-calculate the intermediate bits at node C. When the next data bit $X_3$ arrives, more information is available and is used to refine the intermediate bits at node B. When the next data bit $X_2$ arrives, more information is available and is used to refine the intermediate bits at node A. Finally, when the last data bit $X_1$ arrives, the final output can be quickly calculated using the pre-calculated intermediate bits at node A and the $X_1$ data bit.

FIG. 9 shows a specific example with M=4 and N=15. In general, element selection circuit 830 may receive any number of data bits from quantizer 730 and may generate any number of control signals for DACs 840. Element selection circuit 830 may include M−1 pre-calculation blocks for the M−1 earlier data bits from quantizer 730 and an output calculation block for the latest data bit from quantizer 730.

ΔΣ modulator 700 may be used for an ADC, a DAC, or other digital circuits. The combinatorial circuit with pre-calculation and the ΔΣ modulator described herein may be used for various electronics devices such as wireless communication devices, cellular phones, personal digital assistants (PDAs), handheld devices, wireless modems, laptop computers, cordless phones, broadcast receivers, Bluetooth devices, consumer electronics devices, etc. The use of the ΔΣ modulator for a ΔΣ ADC in a wireless communication device, which may be a cellular phone or some other device, is described below.

Figure 10:
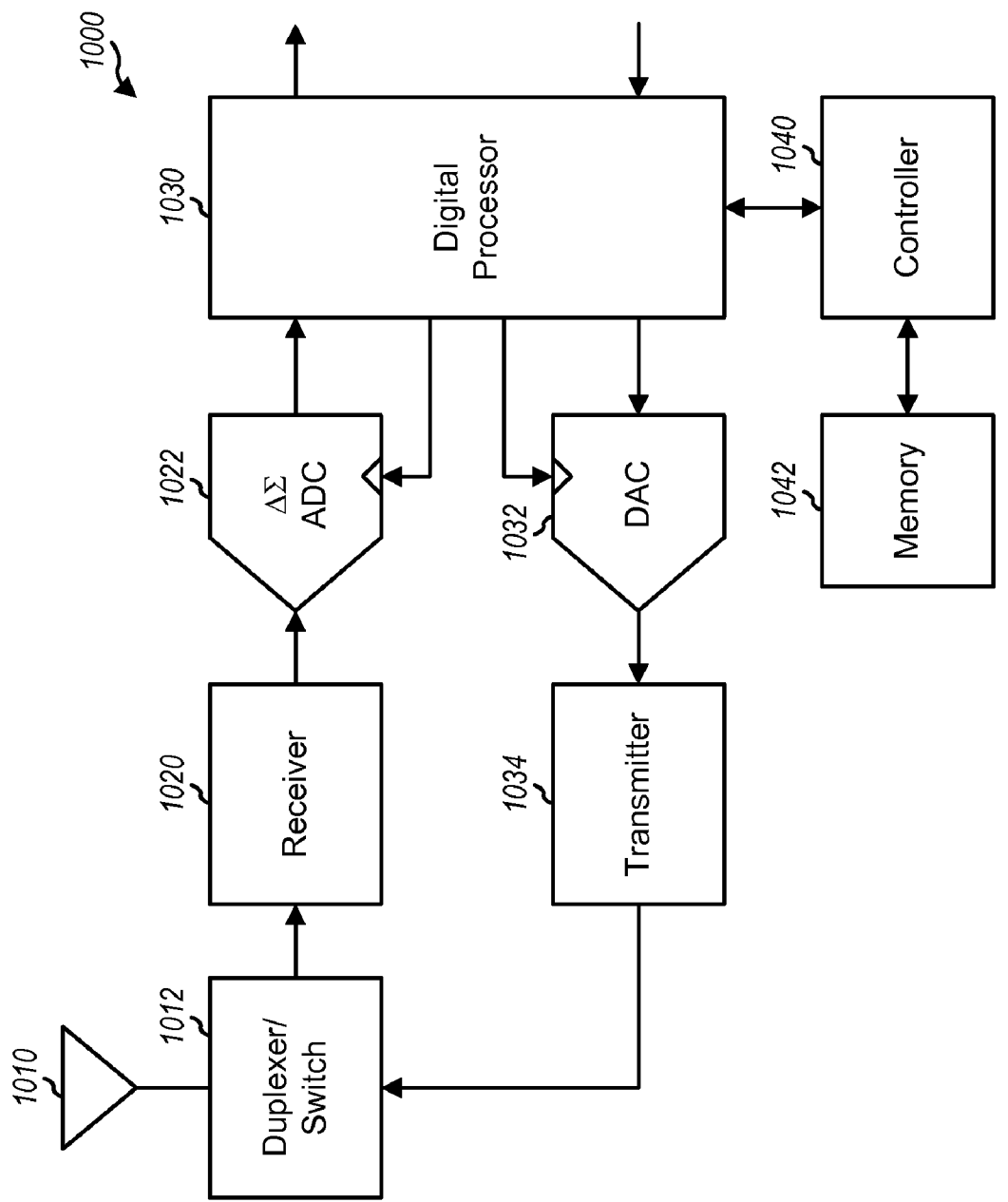
FIG. 10 shows an exemplary design of a wireless communication device.

FIG. 10 shows a block diagram of an exemplary design of a wireless communication device 1000. In the receive path, an antenna 1010 may receive signals from base stations, satellites, and/or other transmitter stations and may provide a received signal. A duplexer/switch 1012 may route the received signal from antenna 1010 to a receiver 1020. Receiver 1020 may condition (e.g., amplify, filter, and downconvert) the received signal and provide an analog input signal. An ΔΣ ADC 1022 may digitize the analog input signal and provide digital samples to a digital processor 1030. ΔΣ ADC 1022 may be implemented with ΔΣ modulator 700 in FIG. 7 or some other ΔΣ modulator. In the transmit path, digital processor 1030 may provide output samples to a DAC 1032, which may convert the output samples to an analog output signal. A transmitter 1034 may amplify, filter and upconvert the analog output signal and provide a transmit signal, which may be routed through duplexer/switch 1012 and transmitted via antenna 1010.

Digital processor 1030 may perform various functions for wireless communication device 1000, e.g., processing for transmitted and received data. A controller 1040 may direct the operation of digital processor 1030. A memory 1042 may store program codes and data for processor 1030 and controller 1040. The combinatorial circuit with pre-calculation described herein may be used in processor 1030, controller 1040, memory 1042, etc. ΔΣ ADC 1022, DAC 1032, processor 1030, controller 1040, and memory 1042 may be implemented on one or more application specific integrated circuits (ASICs) and/or other ICs.

In an exemplary design, an apparatus may implement a combinatorial circuit with pre-calculation and may comprise an input calculation block, at least one pre-calculation block, and an output calculation block. The input calculation block may receive at least two input signals and may generate intermediate signals for the first pre-calculation block. In an exemplary design, the at least two input signals may comprise two earliest input signals, e.g., signals $X_{M-1}$ and $X_M$ shown in FIG. 4. In another exemplary design, the at least two input signals may be a different set of input signals, e.g., signals $V_1$ to $V_L$ shown in FIG. 2. The input calculation block may be determined by a truth table being implemented.

The pre-calculation block(s) may be coupled in series, may receive at least one earlier input signal and the intermediate signals from the input calculation block, and may generate additional intermediate signals. The output calculation block may be coupled to the pre-calculation block(s), may receive the latest input signal and the intermediate signals from the last pre-calculation block, and may generate at least one output signal. The pre-calculation block(s) and the output calculation block may have a structure that may not be dependent on the truth table being implemented, e.g., as shown in FIG. 6C.

In an exemplary design, the pre-calculation block(s) may comprise one pre-calculation block for each earlier input signal, e.g., as shown in FIGS. 2 and 4. Each pre-calculation block may (i) receive a respective earlier input signal and intermediate signals from either a preceding pre-calculation block or the input calculation block and (ii) generate intermediate signals for either a subsequent pre-calculation block or the output calculation block.

In an exemplary design, each pre-calculation block may comprise at least one calculation circuit. Each calculation circuit may (i) receive an earlier input signal for its pre-calculation block and two intermediate signals from either the preceding pre-calculation block or the input calculation block and (ii) generate an intermediate signal for either the subsequent pre-calculation block or the output calculation block. In an exemplary design, the output calculation block may also comprise at least one calculation circuit. Each calculation circuit may receive (i) the latest input signal and two intermediate signals from the last pre-calculation block and (ii) generate a respective output signal. For both the pre-calculation block(s) and the output calculation block, each calculation circuit may implement the logic function shown in Table 1 or some other logic function. Each calculation circuit may be implemented as shown in FIG. 5A or 5B, or with some other design. Each calculation circuit may have a delay of three or fewer logic gates.

FIG. 11 shows an exemplary design of a process 1100 for generating output signals with reduced delay. Multiple input signals comprising at least one earlier input signal and a latest input signal may be received (block 1112). Intermediate signals may be generated based on the at least one earlier input signal in at least one stage, one stage for each earlier input signal (block 1114). Intermediate signals for the first stage may be generated based on at least two input signals, which may comprise (i) two earliest input signals among the multiple input signals, e.g., as shown in FIG. 4, or (ii) different signals than the multiple input signals, e.g., as shown in FIG. 2 (block 1116). At least one output signal may be generated in an output stage based on the latest input signal and the intermediate signals from the last stage among the at least one stage (block 1118).

In an exemplary design of block 1114, for each stage, the earlier input signal for the stage and intermediate signals from a preceding stage may be received and used to generate intermediate signals for a subsequent stage. Each intermediate signal for the subsequent stage may be generated based on the earlier input signal for the stage and two intermediate signals from the preceding stage, e.g., using the logic function shown in Table 1.

In an exemplary design, an apparatus may implement a ΔΣ modulator and may comprise a quantizer, a DEM unit, and multiple DACs, e.g., as shown in FIG. 8. The quantizer may quantize an analog signal and provide multiple data bits in a sequential order. The quantizer may comprise a successive approximation ADC. The DEM unit may receive the multiple data bits, generate intermediate bits based on at least one earlier data bit from the quantizer, and generate multiple control signals based on the intermediate bits and the latest data bit from the quantizer. The multiple DACs may receive the multiple control signals, and each DAC may be controlled by a respective control signal.

In an exemplary design, the DEM unit may comprise a finite state machine and an element selection circuit, e.g., as shown in FIG. 8. The finite state machine may receive the multiple data bits from the quantizer and may generate control bits indicative of state information for the multiple DACs. The element selection circuit may also receive the multiple data bits from the quantizer and the control bits from the finite state machine and may generate the multiple control signals for the DACs.

In an exemplary design, the element selection circuit may comprise an input calculation block, at least one pre-calculation block, and an output calculation block, e.g., as shown in FIG. 9. The input calculation block may receive the control bits from the finite state machine and may generate intermediate bits for the first pre-calculation block. The pre-calculation block(s) may be coupled in series, may receive the at least one earlier data bit from the quantizer and the intermediate bits from the input calculation block, and may generate additional intermediate bits. The output calculation block may receive the intermediate bits from the last pre-calculation block and the latest data bit from the quantizer and may generate the multiple control signals.

In an exemplary design, each pre-calculation block may comprise at least one calculation circuit. Each calculation circuit may (i) receive an earlier data bit for the pre-calculation block and two intermediate bits from either a preceding pre-calculation block or the input calculation block and (ii) generate an intermediate bit for either a subsequent pre-calculation block or the output calculation block. The output calculation block may also comprise one or more calculation circuits, one calculation circuit for each control signal.

FIG. 12 shows an exemplary design of a process 1200 for performing $\Delta\Sigma$ modulation with reduced delay. An analog signal may be quantized, and multiple data bits may be provided in a sequential order (block 1212). Intermediate bits may be generated based on at least one earlier data bit among the multiple data bits (block 1214). Multiple control signals may be generated based on the intermediate bits and the latest data bit among the multiple data bits (block 1216). Multiple DACs may be controlled with the multiple control signals, with each DAC being controlled by a respective control signal (block 1218).

In an exemplary design of block 1214, the intermediate bits may be generated in at least one stage, one stage for each earlier data bit. For each stage, intermediate bits from a preceding state may be received and used to generate intermediate bits for a subsequent stage. Each intermediate bit for the subsequent stage may be generated based on an earlier data bit for the stage and two intermediate bits from the preceding state.

In an exemplary design, a finite state machine may be maintained for the multiple DACs. Control bits may be generated based on the finite state machine and the multiple data bits to achieve dynamic element matching. The intermediate bits may be generated based further on the control bits.

The combinatorial circuit with pre-calculation and the $\Delta\Sigma$ modulator described herein may be implemented on an IC, an analog IC, a radio frequency IC (RFIC), a mixed-signal IC, an ASIC, a printed circuit board (PCB), an electronics device, etc.

The combinatorial circuit and the $\Delta\Sigma$ modulator may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), etc.

An apparatus implementing the combinatorial circuit and/or the $\Delta\Sigma$ modulator described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus with a delta sigma ($\Delta\Sigma$) modulator, comprising:

a quantizer configured to quantize an analog signal and provide multiple data bits in a sequential order, wherein the quantizer comprises a successive approximation analog-to-digital converter (ADC);

a dynamic matching element (DEM) unit coupled to the quantizer and configured to receive the multiple data bits, to generate intermediate bits based on at least one earlier data bit from the quantizer, and to generate multiple control signals based on the intermediate bits and a latest data bit from the quantizer; and multiple digital-to-analog converters (DACs) coupled to the DEM unit and configured to receive the multiple control signals, each DAC being controlled by a respective control signal.

2. The apparatus of claim 1, wherein the DEM unit comprises:
an element selection circuit configured to receive the multiple data bits from the quantizer and to generate the multiple control signals for the DACs, the element selection circuit comprising:
at least one pre-calculation block coupled in series and configured to receive the at least one earlier data bit from the quantizer and to generate the intermediate bits; and
an output calculation block coupled to the at least one pre-calculation block and configured to receive intermediate bits from a last pre-calculation block and the latest data bit from the quantizer and to generate the multiple control signals.

3. An apparatus with a delta sigma (ΔΣ) modulator, comprising:
a quantizer configured to quantize an analog signal and provide multiple data bits in a sequential order, wherein the quantizer comprises a successive approximation analog-to-digital converter (ADC);
a dynamic matching element (DEM) unit coupled to the quantizer and configured to receive the multiple data bits, to generate intermediate bits based on at least one earlier data bit from the quantizer, and to generate multiple control signals based on the intermediate bits and a latest data bit from the quantizer; and
multiple digital-to-analog converters (DACs) coupled to the DEM unit and configured to receive the multiple control signals, each DAC being controlled by a respective control signal, wherein the DEM unit comprises:
an element selection circuit configured to receive the multiple data bits from the quantizer and to generate the multiple control signals for the DACs, the element selection circuit comprising:
at least one pre-calculation block coupled in series and configured to receive the at least one earlier data bit from the quantizer and to generate the intermediate bits; and
an output calculation block coupled to the at least one pre-calculation block and configured to receive intermediate bits from a last pre-calculation block and the latest data bit from the quantizer and to generate the multiple control signals, wherein each pre-calculation block comprises at least one calculation circuit, each calculation circuit configured to receive an earlier data bit for the pre-calculation block and two intermediate bits from either a preceding pre-calculation block or an input calculation block and to generate an intermediate bit for either a subsequent pre-calculation block or the output calculation block.

4. An apparatus with a delta sigma (ΔΣ) modulator, comprising:
a quantizer configured to quantize an analog signal and provide multiple data bits in a sequential order, wherein the quantizer comprises a successive approximation analog-to-digital converter (ADC);
a dynamic matching element (DEM) unit coupled to the quantizer and configured to receive the multiple data bits, to generate intermediate bits based on at least one earlier data bit from the quantizer, and to generate multiple control signals based on the intermediate bits and a latest data bit from the quantizer; and
multiple digital-to-analog converters (DACs) coupled to the DEM unit and configured to receive the multiple control signals, each DAC being controlled by a respective control signal, wherein the DEM unit comprises:
an element selection circuit configured to receive the multiple data bits from the quantizer and to generate the multiple control signals for the DACs, the element selection circuit comprising:
at least one pre-calculation block coupled in series and configured to receive the at least one earlier data bit from the quantizer and to generate the intermediate bits; and
an output calculation block coupled to the at least one pre-calculation block and configured to receive intermediate bits from a last pre-calculation block and the latest data bit from the quantizer and to generate the multiple control signals; and
a finite state machine (FSM) configured to receive the multiple data bits from the quantizer and to generate control bits indicative of state information for the multiple DACs.

5. The apparatus of claim 4, wherein the element selection circuit further comprises an input calculation block coupled to the FSM and configured to receive the control bits from the FSM and to generate intermediate bits for a first pre-calculation block.

6. A method comprising:
quantizing an analog signal and providing multiple data bits in a sequential order by using a successive approximation analog-to-digital converter (ADC);
generating intermediate bits based on at least one earlier data bit among the multiple data bits;
generating multiple control signals based on the intermediate bits and a latest data bit among the multiple data bits; and
controlling multiple digital-to-analog converters (DACs) with the multiple control signals, each DAC being controlled by a respective control signal.

7. The method of claim 6, wherein the generating the intermediate bits comprises generating the intermediate bits in at least one stage, one stage for each earlier data bit.

8. A method comprising:
quantizing an analog signal and providing multiple data bits in a sequential order by using a successive approximation analog-to-digital converter (ADC);
generating intermediate bits based on at least one earlier data bit among the multiple data bits;
generating multiple control signals based on the intermediate bits and a latest data bit among the multiple data bits; and
controlling multiple digital-to-analog converters (DACs) with the multiple control signals, each DAC being controlled by a respective control signal, wherein the generating the intermediate bits comprises generating the intermediate bits in at least one stage, one stage for each earlier data bit,
wherein the generating the intermediate bits comprises, for each stage:
receiving intermediate bits from a preceding stage; and
generating intermediate bits for a subsequent stage, each intermediate bit for the subsequent stage being generated based on an earlier data bit for the stage and two intermediate bits from the preceding state.

9. A method comprising:
quantizing an analog signal and providing multiple data bits in a sequential order by using a successive approximation analog-to-digital converter (ADC);
generating intermediate bits based on at least one earlier data bit among the multiple data bits;

generating multiple control signals based on the intermediate bits and a latest data bit among the multiple data bits;

controlling multiple digital-to-analog converters (DACs) with the multiple control signals, each DAC being controlled by a respective control signal;

maintaining a finite state machine for the multiple DACs; and generating control bits based on the finite state machine and the multiple data bits to achieve dynamic element matching, and wherein the intermediate bits are generated based further on the control bits.

10. An apparatus comprising:

means for quantizing an analog signal and providing multiple data bits in a sequential order, wherein the means for quantizing comprises a successive approximation analog-to-digital converter (ADC);

means for generating intermediate bits based on at least one earlier data bit among the multiple data bits;

means for generating multiple control signals based on the intermediate bits and a latest data bit among the multiple data bits; and means for controlling multiple digital-to-analog converters (DACs) with the multiple control signals, each DAC being controlled by a respective control signal.

11. The apparatus of claim 10, wherein the means for generating the intermediate bits comprises means for generating the intermediate bits in at least one stage, one stage for each earlier data bit, each stage comprising:

means for receiving intermediate bits from a preceding stage; and means for generating intermediate bits for a subsequent stage, each intermediate bit for the subsequent stage being generated based on an earlier data bit for the stage and two intermediate bits from the preceding state.

12. An apparatus comprising:

means for quantizing an analog signal and providing multiple data bits in a sequential order, wherein the means for quantizing comprises a successive approximation analog-to-digital converter (ADC);

means for generating intermediate bits based on at least one earlier data bit among the multiple data bits;

means for generating multiple control signals based on the intermediate bits and a latest data bit among the multiple data bits;

means for controlling multiple digital-to-analog converters (DACs) with the multiple control signals, each DAC being controlled by a respective control signal;

means for maintaining a finite state machine for the multiple DACs; and means for generating control bits based on the finite state machine and the multiple data bits to achieve dynamic element matching, and wherein the intermediate bits are generated based further on the control bits.

13. A wireless communication device comprising:

a receiver configured to receive and condition a received signal and provide an analog input signal; and a delta sigma (ΔΣ) analog-to-digital converter (ADC) coupled to the receiver and configured to digitize the analog input signal and provide multiple data bits, the ΔΣ ADC comprising:

a quantizer configured to quantize an internal signal and provide the multiple data bits in a sequential order, wherein the quantizer comprises a successive approximation analog-to-digital converter (ADC);

a dynamic matching element (DEM) unit coupled to the quantizer and configured to receive the multiple data bits, to generate intermediate bits based on at least one earlier data bit from the quantizer, and to generate multiple control signals based on the intermediate bits and a latest data bit from the quantizer; and multiple digital-to-analog converters (DACs) coupled to the DEM unit and configured to receive the multiple control signals, each DAC being controlled by a respective control signal.

14. A delta sigma modulator comprising:

a successive approximation analog-to-digital converter (ADC) that digitizes an input analog signal and outputs a corresponding multi-bit digital value, wherein the multi-bit digital value comprises at least a first data bit, a second data bit, and third data bit, wherein the successive approximation ADC successively determines and outputs the data bits of the multi-bit digital value one bit at a time, wherein the first data bit is determined and output first, followed by the second data bit, followed by the third data bit;

a dynamic matching element (DEM) unit coupled to the successive approximation ADC, wherein the DEM unit comprises:

a first amount of combinatorial logic that outputs a first plurality of intermediate bits;

a second amount of combinatorial logic that receives the first data bit and the first plurality of intermediate bits and generates therefrom a second plurality of intermediate bits;

a third amount of combinatorial logic that receives the second data bit and the second plurality of intermediate bits and generates therefrom a third plurality of intermediate bits; and a fourth amount of combinatorial logic that receives the third data bit and the third plurality of intermediate bits and generates therefrom a plurality of control signals; and multiple digital-to-analog converters (DACs) coupled to receive the plurality of control signals, wherein each DAC is controlled by a respective one of the plurality of control signals.

15. The delta sigma modulator of claim 14, wherein the DEM unit further comprises:

a clocked finite state machine that receives the multi-bit digital value from the successive approximation ADC and that outputs a multi-bit digital control value; and an input calculation block that receives the multi-bit digital control value from the clocked finite state machine.

16. The delta sigma modulator of claim 15, wherein the first amount of combinatorial logic is a first pre-calculation block, wherein the second amount of combinatorial logic is a second pre-calculation block, wherein the third amount of combinatorial logic is a third pre-calculation block, and wherein the fourth amount of combinatorial logic is an output calculation block.

17. The delta sigma modulator of claim 15, wherein the input calculation block includes no sequential logic element, wherein the first amount of combinatorial logic includes no sequential logic element, wherein the second amount of combinatorial logic includes no sequential logic element, wherein the third amount of combinatorial logic includes no sequential logic element, and wherein the fourth amount of combinatorial logic includes no sequential logic element.

18. The delta sigma modulator of claim 14, wherein a portion of the DEM unit involving the first, second, third and fourth amounts of combinatorial logic operates substantially in parallel with the successive approximation ADC.

19. The delta sigma modulator of claim 14, wherein a sample clock triggers each of the successive approximation ADC, the clocked finite state machine, and the plurality of DACs.

* * * * *